United States Patent
Lee et al.

(10) Patent No.: US 6,944,347 B2
(45) Date of Patent: Sep. 13, 2005

(54) IMAGE COMPRESSION AND RESTORING METHOD FOR BINARY IMAGES

(75) Inventors: Chul Soo Lee, Daejon (KR); Hyun Wook Park, Daejon (KR)

(73) Assignee: Korea Advanced Institute of Science and Technology, Daejon (KR)

( * ) Notice: Subject to any disclaimer, the term of this patent is extended or adjusted under 35 U.S.C. 154(b) by 622 days.

(21) Appl. No.: 10/143,069

(22) Filed: May 10, 2002

(65) Prior Publication Data

US 2003/0210823 A1 Nov. 13, 2003

(51) Int. Cl.$^7$ .............................. G06K 9/36; G06K 9/46
(52) U.S. Cl. ....................... 382/237; 382/238; 382/239; 382/247; 382/253; 358/2.99; 358/539
(58) Field of Search ................... 382/237, 238, 382/239, 247, 253; 358/2.99, 539, 426.07

(56) References Cited

U.S. PATENT DOCUMENTS

| | | | | |
|---|---|---|---|---|
| 4,891,643 A | * | 1/1990 | Mitchell et al. ............ 341/107 |
| 4,901,363 A | * | 2/1990 | Toyokawa .................. 382/239 |
| 4,973,961 A | * | 11/1990 | Chamzas et al. ............. 341/51 |
| 5,023,611 A | * | 6/1991 | Chamzas et al. ............. 341/51 |
| 5,142,283 A | * | 8/1992 | Chevion et al. ............ 341/107 |
| 5,694,128 A | * | 12/1997 | Kim ............................. 341/79 |
| 5,867,114 A | * | 2/1999 | Barbir ........................ 341/107 |
| 5,963,672 A | * | 10/1999 | Yajima et al. ............... 382/238 |
| 6,285,301 B1 | * | 9/2001 | Bruekers et al. .............. 341/51 |
| 6,298,150 B1 | * | 10/2001 | Sonoda et al. .............. 382/162 |
| 6,411,231 B1 | * | 6/2002 | Yanagiya et al. ........... 341/107 |
| 6,553,144 B1 | * | 4/2003 | Hirao et al. ................ 382/239 |

* cited by examiner

*Primary Examiner*—Joseph Mancuso
*Assistant Examiner*—Manav Seth
(74) *Attorney, Agent, or Firm*—Harness, Dickey & Pierce, P.L.C.

(57) ABSTRACT

The present invention relates to the image compression and restoring method for binary images that can be used in binary image equipment including printers.

In the present invention, an image is not compressed by each pixel but by cell that combines four pixels. And each cell is compressed in two steps. In the first step, the number of black pixels contained in the cell is compressed. And in the second step, using the number of pixels the information compressed in the previous step, the exact location of pixels that constitute the cell is compressed. By doing this, the compression rate can be increased. And even when the compressed bit rows are restored in the first step, image restoration is available with just a small degradation.

11 Claims, 6 Drawing Sheets

IMAGE COMPRESSION AND RESTORING METHOD FOR BINARY IMAGES

BACKGROUND OF THE INVENTION

1. Field of the Invention

The present invention relates to image compression and restoring method for binary images that can be used for binary image equipment including printers. More particularly, the present invention relates to a technique to enhance the compression rate of binary image by compressing the image not by pixel but by cell that combines four pixels and compressing each cell in two steps.

2. Description of the Related Art

Recently as data volume for multimedia increases at a rapid pace, users' printing needs become to involve various forms such as complex graphics or contents of the Internet. According this trend of increasing data capacity, development researches are carried out to speed up the printing speed of printers.

Currently the printers with 600 dpi resolution prevail, but a higher resolution is expected for printers as technology develops. As the printing resolution becomes higher, data volume for treatment increases, which has a great impact on the data transmission time between the host and the printer.

The binary image compression techniques have been developed originally for facsimiles, and then later applied for printers. JBIG, which is a standard for binary image compression, has the following features.

1. The resolution is lowered for progressive transmission.
2. The pre-defined template is used for predicting the probability of pixel.
3. The encoder uses the binary arithmetic coding technique.
4. Using lookup tables for arithmetic operations for the probability estimation and compression dispense with multiplications and divisions.

JBIG that has aforementioned features shows an excellent performance for document images produced by document editors or graphic image involving sequential screens. On the other hand JBIG has not shown such an excellent performance in compressing images produced by the error diffusion method.

Although there is another alternative technique that uses wavelet transform, this technique also does not show a good performance for graphic images while it is rather good at document images.

SUMMARY OF THE INVENTION

The present invention is to resolve the aforementioned problems in the prior art. It is an object of the present invention to provide a method for compressing and restoring binary image to enhance the compression rate of binary image by compressing the image not by pixel but by cell that combines four pixels and compressing each cell in two steps.

To achieve the object of the present invention, the present invention provides a binary image compressing method of rearranging the image data form outputted from a printing device, encoding four dots as a single unit, and then compressing, said method comprising; a step of pre-processing an image into said rearranged image and estimating S-value of each cell; a step of predicting the probability of S-value by delaying said estimated S-value; and a step of predicting the probability of the current symbol through predicting said probability of S-value and outputting said predicted probability in the entropy coded form.

Said binary image compressing method further comprising; a step of storing said pre-processed image into an image buffer and estimating S-value for the current cell to be compressed; a step of estimating C-value of each cell from said image buffer; a step of predicting the probability of C-value by delaying said estimated C-value; and a step of predicting the probability of the current symbol through predicting said probability of C-value and outputting said predicted probability in the entropy coded form.

Also, the present invention provides a binary image restoring method of rearranging the compressed image data form, decoding four dots as a single unit, and then restoring, said method comprising; a step of entropy-decoding the S-value of each cell estimated from said compressed image; a step of predicting the probability of S-value by delaying said decoded S-value; and a step of predicting the probability of the current symbol through predicting said probability of S-value.

Said binary image restoring method further comprising; a step of entropy-decoding the C-value of each cell estimated from said compressed image; a step of predicting the probability of C-value by delaying said decoded C-value and in addition predicting the probability of S-value that is stored in decoded format in the image buffer; and a step of predicting the probability of the current symbol through predicting said probability of C-value.

The above and other features and advantages of the present invention will be more clearly understood for those skilled in the art from the following detailed description in conjunction with the accompanying drawings, which form a part of this disclosure.

DETAILED DESCRIPTION OF THE EMBODIMENT

Hereinafter, the constitution and operation of the present invention is described in detail through preferred embodiments by referring to the accompanying drawings.

Before we describe the data compression and restoring method for binary images according to the present invention, we need to define several basic terms as follows.

1) Cell: 2×2 pixels, the unit of compression used in the present invention.
2) S-value: 'Number' of black pixels in the cell.
3) C-value: 'Binary' representing the black pixels in the cell 4) S-value context: Context to predict the probability of S-value, which consists of S-values of the neighboring pixels.

5) C-value context: Context to predict the probability of C-value, which consists of C-values of the neighboring pixels and the c-value of the current cell.

Figures 5, 6:
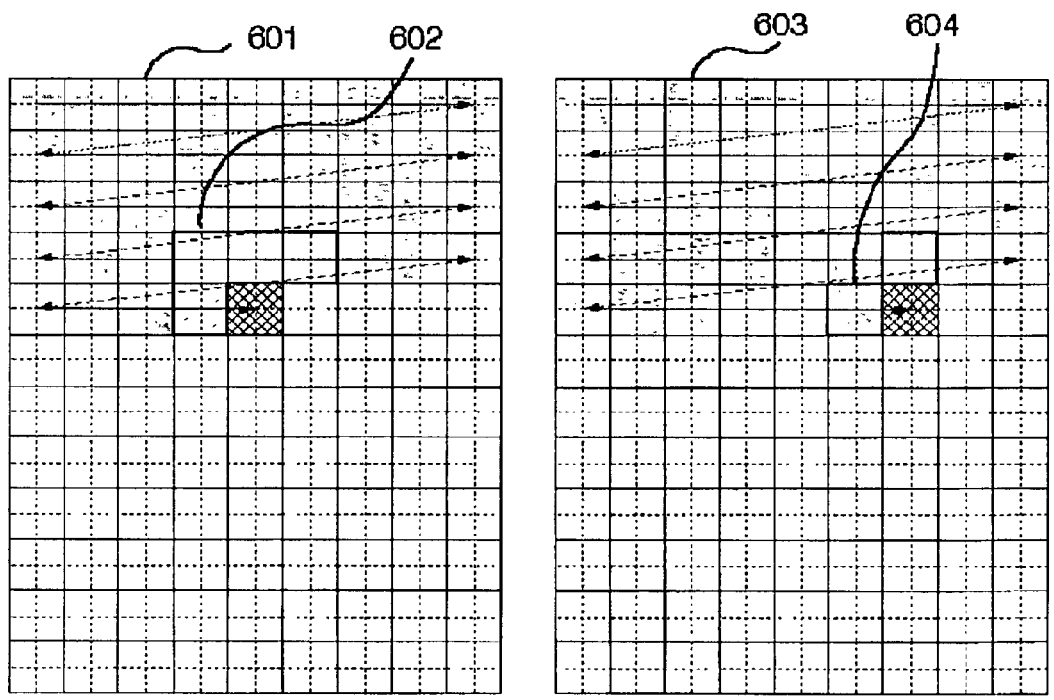
FIG. 5 illustrates a cell represented in accordance with the present invention.
FIG. 6 is a diagram illustrating the form of template used the probability predictors for S-value and C-value shown in FIG. 3 and FIG. 4 and the order of scanning.

Each definition is exemplified in FIG. 5 and FIG. 6. In FIG. 5, one cell is shown as an example, where S-value is '2' and C-value is '6'. Each cell can be represented by S-value and C-value, and S-value can have five values of (0, 1, 2, 3, 4) and C-value can have 16 values of (0, 1, . . . , 15).

In FIG. 6, the cells that are needed for S-value context of the current cell for compression (■) are indicated by ■ and the cells that are required for C-value context for the current cell are indicated by ■. The direction of arrows indicates the order of image scanning for compression.

Now, mathematical equations that are basic to the present invention are described.

When the symbols of above cell are compressed, the ideal code length is calculated by the following equation.

$$L(x) = -\sum_{t=1}^{T} \log(p(x_t))$$ [Equation. 1]

Here, x is the symbol stream for compression, xt is the symbol for the current compression, and t is the time parameter. And L(x) represents the total length, p(xt) represents the probability distribution, and the base of log is 2. Because it is impossible to find the exact probability distribution in Eqn.1, We need to estimate the probability. And since L(x) may not be an integer, Eqn.1 can be rewritten as follows.

$$\tilde{L}(x) = -\sum_{t=1}^{T} \log(\tilde{p}(x_t))$$ [Equation. 2]

Here, $\tilde{p}(x_t)$ represent the probability distribution estimated from symbol stream.

Using the Bayes theorem, $\tilde{p}(x_t)$ can be rewritten as $$\sum_{l} \tilde{p}(x_t \mid B_l)\tilde{p}(B_l).$$

Here, Bl represents a set including the elements having S-value of l, and xt belongs to one of five sets, for example, if $x_t \notin B_l$, $\tilde{p}(x_t \mid B_l)=0$. This means that xt is included exclusively to Bl. On inserting this into Eqn.2, the following equation is obtained.

$$\tilde{L}(x) = -\sum_{t=1}^{T}\left[\log\sum_{l=0}^{4}(\tilde{p}(x_t \mid B_l)\tilde{p}(B_l))\right]$$ [Equation. 3]

$$\tilde{L}(x) = -\sum_{t=1}^{T} \log(\tilde{p}(x_t \mid B_j)\tilde{p}(B_j))$$ [Equation. 4]

$$\tilde{L}(x) = \left[-\sum_{t=1}^{T} \log\tilde{p}(B_j)\right] + \left[-\sum_{t=1}^{T} \log\tilde{p}(x_t \mid B_j)\right]$$ [Equation. 5]

In Eqn.4 and Eqn.5, j represents S-value of xt.

From Eqn.5, one can see the code length of the whole compressed symbols is divided into two terms. The first term is the sum of the code length of the compressed conditions and the second term is the sum of the code length of the compressed symbols under a given condition.

Now described is the probability estimation in accordance with the present invention. In this invention, since the arithmetic encoder is used, the probability distributions of the symbols need to be found. To find the probability distribution, a Bayesian estimator is used. Basically, although the probability of a symbol is proportional to the occurrence of the symbol, there exist symbols that occur extremely rarely. Therefore, we choose the uniform distribution for the initial probability. In other words, if there are N symbols, the initial probability of each symbol is as follows.

$$P(1)=P(2)= \ldots =P(N)=1/N$$ [Equation. 6]

Using the initial probability of Eqn.6, the probability to be used in Eqn.5 is estimated. In the first term of Eqn.5, $\tilde{p}(B_j)$ means the probability that S-value of the current cell is '1'. In the present invention, the probability is obtained using the neighboring cells and the following equation is used.

$$\tilde{p}(B_j) = \frac{n_{CX(s)}(l) + \delta}{\sum_{i=0}^{N_s} n_{CX(s)}(i) + (N_s + 1)\delta}$$ [Equation. 7]

Here, ncx(s) (1) represents the number of the occurrence of B1 for a given CX(s). is determined by S-values of the neighboring cells. Ns is the maximum value of 1, i.e., 4 and δ represents the preceding value.

In the second term of Eqn.5, $\tilde{p}(x_t \mid B_j)$ represents the conditional probability of xt given the S-value of the current cell. Since this condition was compressed previously, this probability is obtained by the following equation.

$$\tilde{p}(x_t = k \mid B_j) = \frac{n_{CX(c,j)}(k) + \delta}{\sum_{i \in B(j)} n_{CX(c,j)}(i) + N(B_j)\delta}$$ [Equation. 8]

In Eqn.8, ncx(c,j) (k) represents the frequency where the value of xt is k given the context CX(c,j). Bj represents the set of elements whose S-value is j, and N(Bj) represents the number of elements which Bj includes.

The arithmetic compression uses Eqn.5 and Eqn.6. for the symbol probabilities.

Now, the present invention is explained in more detail by referring the accompanying drawings.

Figure 1:
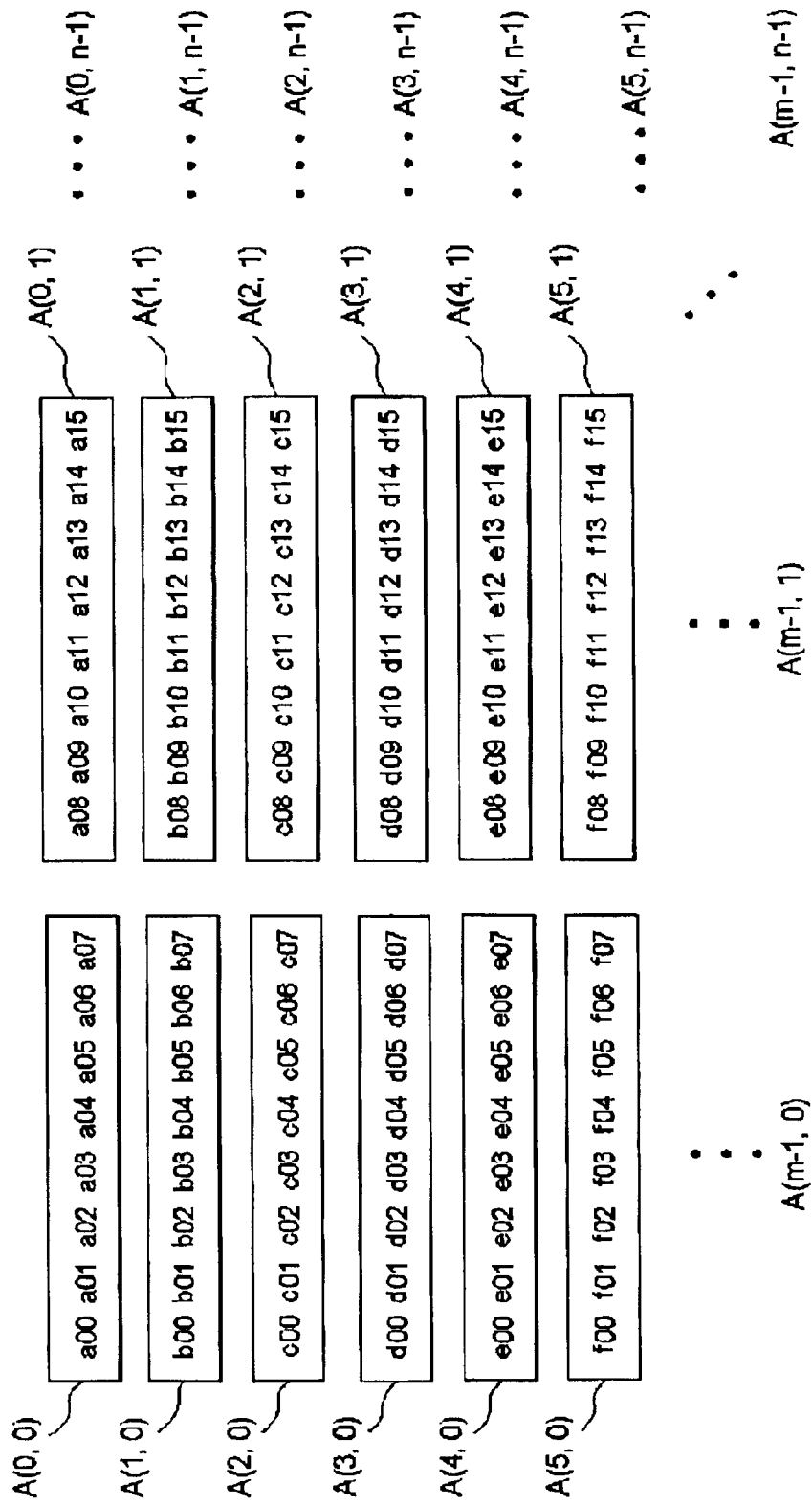
FIG. 1 illustrates the arrangement of printing data inputted to a printer.
Figure 2:
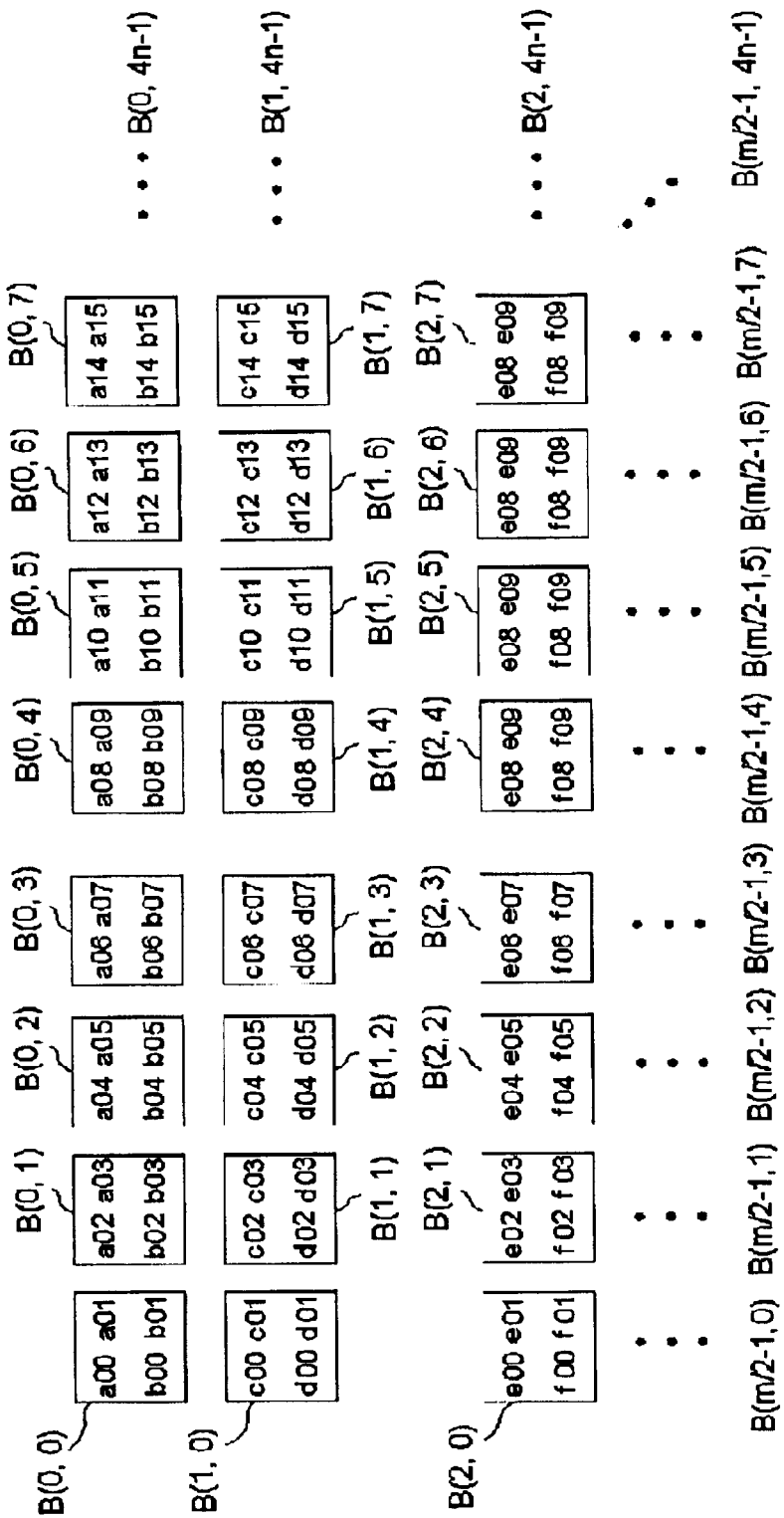
FIG. 2 illustrates the form rearranged from the printing data of FIG. 1 according to the present invention.

FIG. 1 shows the format of print data that is inputted to the printer, i.e., printing device. Basically one byte for printer input is formed by eight pixels. As shown in FIG. 1, one row of an image consists of n×8 pixels, and an image consists of m rows. In the present invention, the image print data as shown in FIG. 1 is rearranged in the format as shown in FIG. 2 for compression convenience. For example, the pixels of a00, a01, b00, and b01 are rearranged as one cell at the location of B(0,0) in FIG. 2, and the cells are used as the basic unit for compression process.

In the present invention, based on Eqn.5, each compression and restoration process is divided into two steps. In the first step, S-value of each cell is compressed (restored), and in the second step, C-value of each cell is compressed (restored) using the S-values compressed (restored) in the first step.

Figure 3:
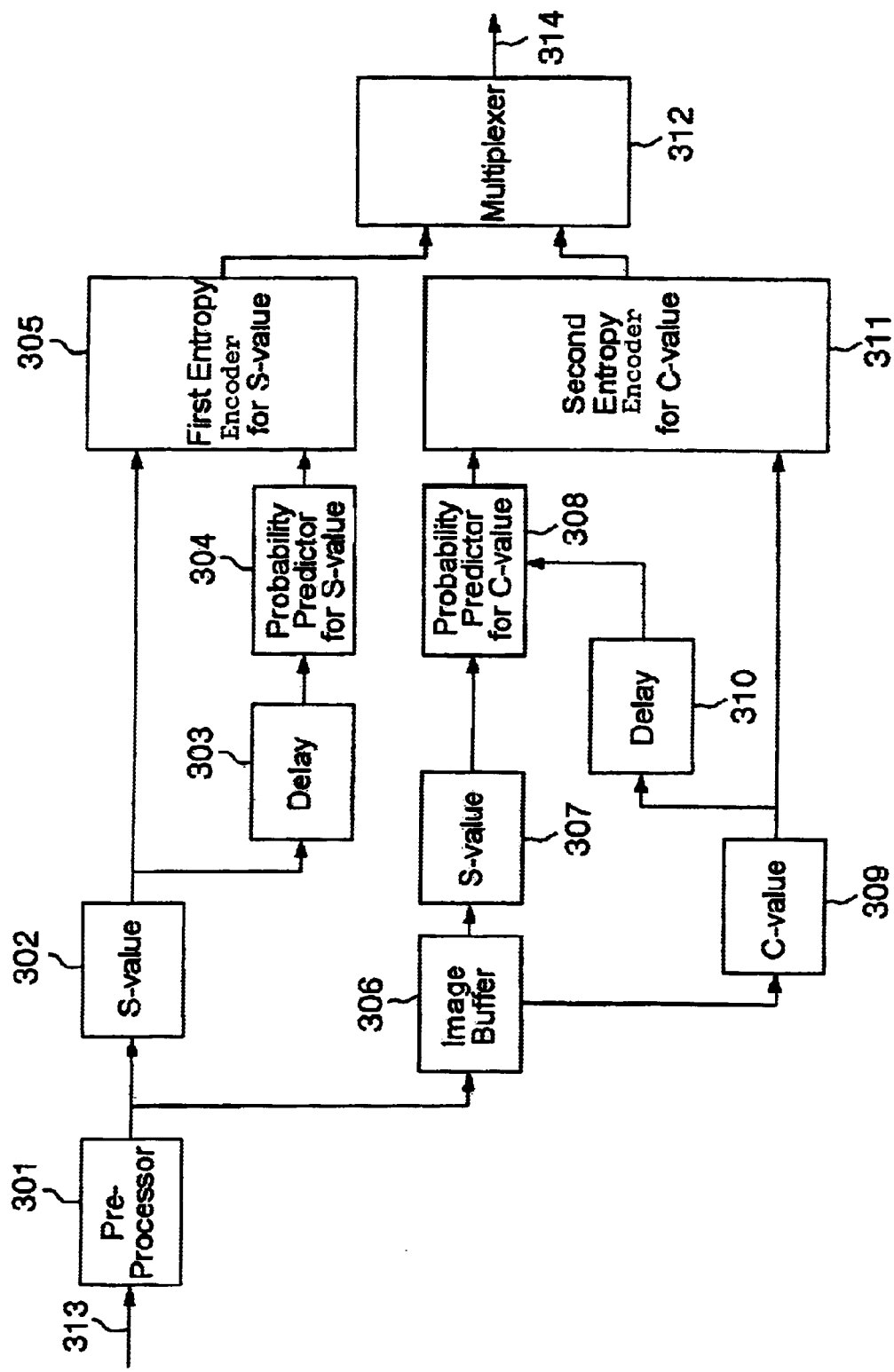
FIG. 3 is the block configuration of the device of compressing printing data in accordance with the present invention.
Figure 4:
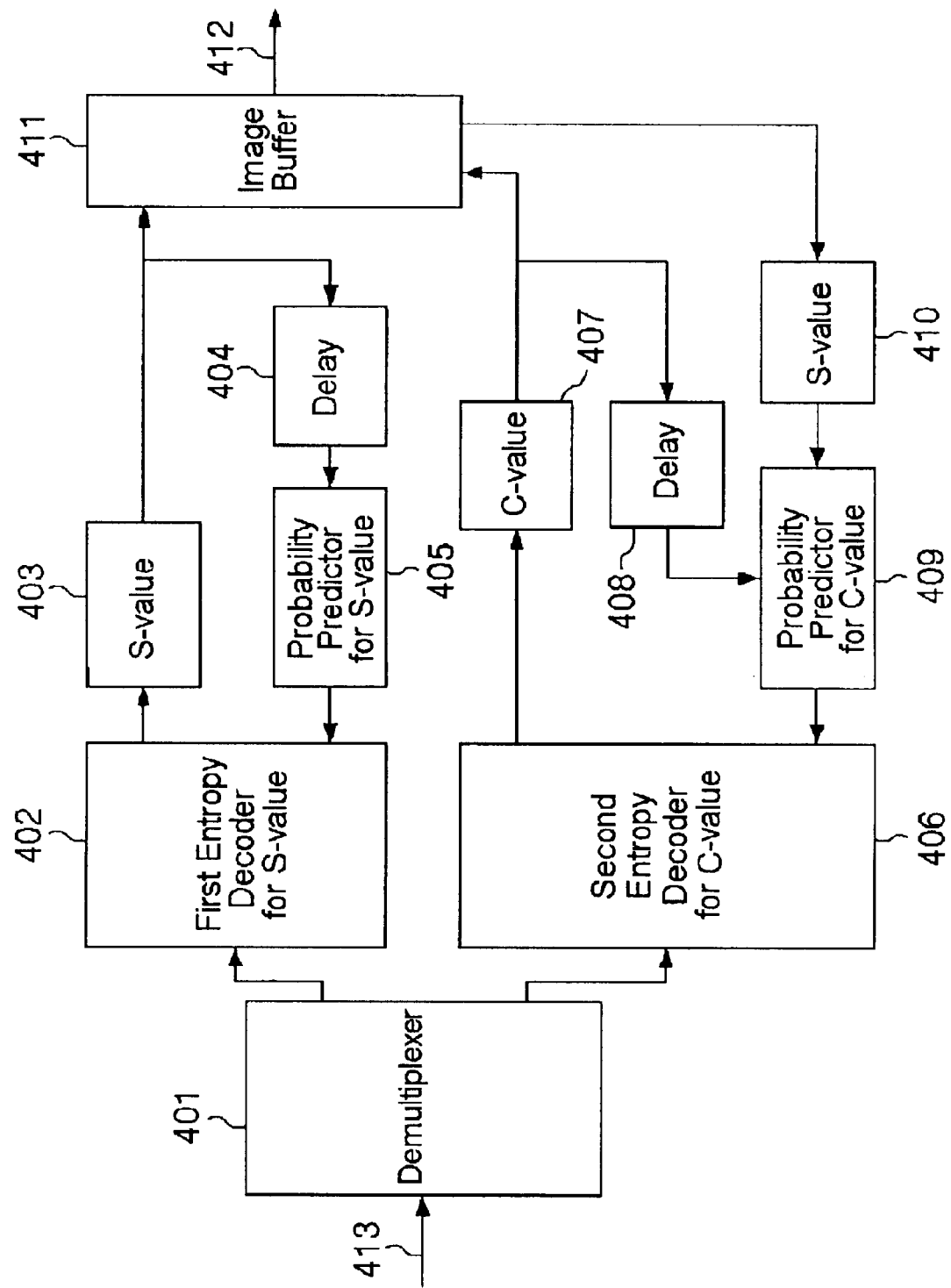
FIG. 4 is the block configuration of the device of restoring printing data in accordance with the present invention.

FIG. 3 illustrates the configuration of compression device and FIG. 4 illustrates that of restoring device. First, the compression process is described as for FIG. 3, and then the restoring process, the reverse process, is described based on FIG. 4.

Referring to FIG. 3, as described previously S-value is compressed in the first step, and S-value of each cell of the rearranged image is estimated in Block 302 and sent to the entropy encoder. The S-value determined previously in 302 passes through a delay (303) and enters to the S-value probability estimator (304). Here, the reason a delay (303) is needed is that, since the current symbol is not known in the restoring process, the restoration must be done with only the previously restored information.

In the S-value probability predictor (304), the probability of the current symbol is predicted by using Eqn.7 and the S-value shown at 601 of FIG. 6, and the predicted probability is sent to the entropy encoder (305). The first entropy encoder (305) for S-value uses the arithmetic encoding method. The bit row compressed at Block 305 is outputted through the multiplexer (312).

In the second step, C-value of each cell is compressed using the S-values compressed (restored) in the first step. First, an image passed through the preprocessor (301) is stored in the image buffer (306) during the first step and then S-value for the current cell to be compressed is obtained from Block 307. C-value (309) is determined from the image buffer (306) in the same way as in the first step. The C-value via a delay (310) enters into the probability estimator for C-value (308), where C-value probability is estimated using Eqn.6. The difference from the first step is that S-values are used in the probability estimator for C-value (308). The C-value context (604) shown in 603 of FIG. 6 and the S-value compressed in the previous step are used. The second entropy encoder (311) for C-value uses arithmetic encoding method. Multiplexer (312) sends outputs of Block 305 in the output bit rows for the first step and outputs of Block 311 for the second step. Multiplexer (312) may be combined with the previous two encoders (305, 311). Or one of the two encoders may function as the multilexer.

Now turning to the restoring process of the present invention, the process is the reverse of the compression process as shown in FIG. 4. Once a compressed bit row enters the demultiplxer (401) through path 413, it is sent to Block 402 for performing the first step of the restoring process. Once the first step of the restoring is finished, the bit row is sent to Block 406. Here, the three blocks may be combined as a single block.

In the first step, the entropy decoder decodes S-value and sends to the image buffer (411) via path 403. As in the compression process, since decoded symbols have to be used to predict probability, bit rows are inputted to the probability estimator for S-value (405) via a delay (404). In the probability estimator for S-value (405), the probability of current symbol is predicted using Eqn.7 and the S-value context (602) shown in FIG. 6.

In the second step, compressed bit rows are used to restore C-value (407) in the second entropy decoder (406). As in the first step, bit rows enter the probability estimator for C-value (409) via a delay (408). But differently from the first step, the current S-value stored in the image buffer (411) that is restored in the first step also enters the probability estimator (409).

Figure 7:
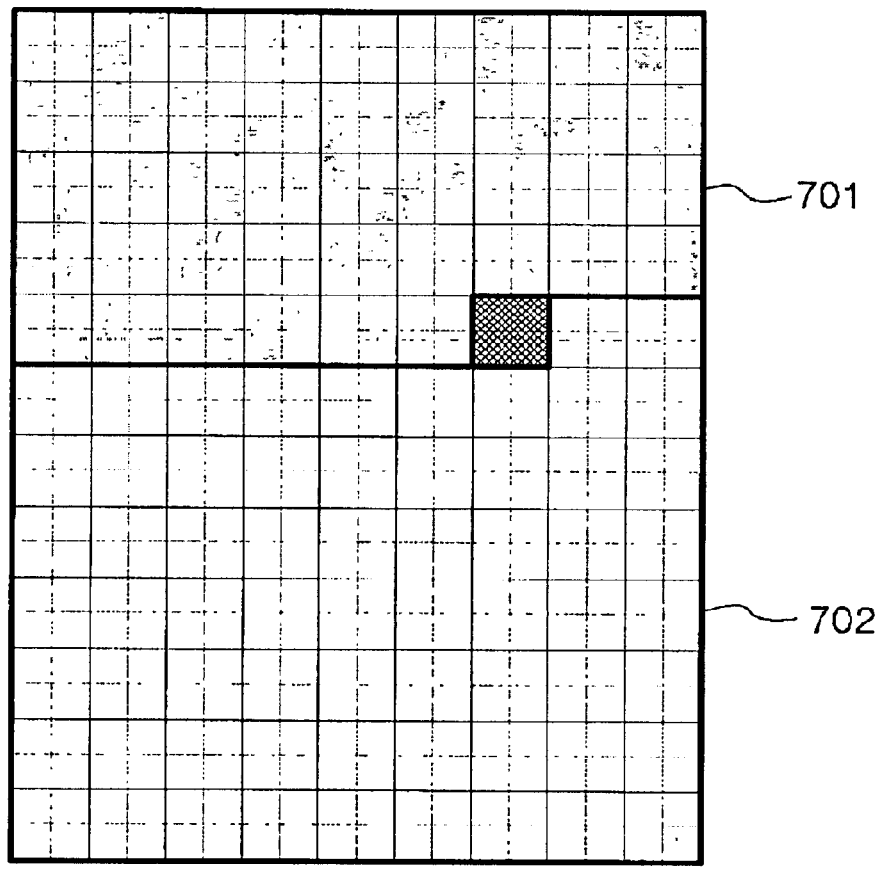
FIG. 7 illustrates the image pattern shown in the second step of the restoring process of FIG. 4.

In FIG. 7, the restored image obtained in the second step of the restoring process is shown. Since the whole image is restored in the first step, S-value of each cell is restored accurately, but the pixel location in each cell in area 702 is not accurate. However, area 701 that is finished up to the second step of restoration has no loss of information comparing with the original image.

As described above, the image compression and restoring method for binary image in accordance with the present invention has the following effects.

In the present invention, an image is not compressed by each pixel but by cell that combines four pixels. And each cell is compressed in two steps. In the first step, the number of black pixels contained in the cell is compressed. And in the second step, using the number of pixels the information compressed in the previous step, the exact location of pixels that constitute the cell is compressed. By doing this, the compression rate can be increased. And even when the compressed bit rows are restored in the first step, image restoration is available with just a small degradation.

Although the present invention for image compression and restoring method for binary image has been described along with the accompanying drawings, this only illustrates preferred embodiments but not limits the scope of the present invention. It will be apparent for those skilled in the art that various modifications may be made without departing from the spirit and scope of the present invention as defined by the appended claims.

What is claimed is:

1. A binary image compression method of rearranging the image data form outputted to a printing device, encoding four dots as a single cell, and then compressing, said method comprising;

a step of pre-processing an image into said rearranged image and determining S-value of each cell;

a step of estimating the probability of S-value by delaying said determined S-value; and a step of estimating the probability of the current symbol through estimating said probability of S-value and outputting said estimated probability using the entropy coder.

2. The binary image compression method of claim 1, wherein said method further comprising;

a step of storing said pre-processed image into an image buffer and determining S-value of the current cell to be compressed;

a step of determining C-value of each cell from said image buffer;

a step of estimating the probability of C-value by delaying said determined C-value and S-value of the current cell; and a step of estimating the probability of the current symbol through estimating said probability of C-value and outputting said estimated probability using the entropy encoder.

3. The binary image compression method of claim 1, wherein entropy-encoding process for said estimated probabilities of the S-value of the current cell is characterized to use the arithmetic coding scheme.

4. The binary image compression method of claim 2, wherein entropy-encoding process for said estimated probabilities of the S-value and the C-value of the current cell is characterized to use the arithmetic coding scheme.

5. The binary image compression method of claim 2, wherein entropy-encoding process for said estimated probabilities of the S-value and the C-value of the current cell is characterized to output through a single combined entropy-encoder.

6. The binary image compression method of claim 1, wherein entropy-encoding process for said estimated probabilities of the S-value of the current cell is characterized to output through one of the arbitrarily chosen entropy-encoders.

7. The binary image compression method of claim 2, wherein entropy-encoding process for said estimated probabilities of the S-value and the C-value of the current cell is characterized to output through one of the arbitrarily chosen entropy-encoders.

8. A binary image restoring method of rearranging the compressed image data form, decoding a single cell into four dots and then restoring, said method comprising;
- a step of entropy-decoding the S-value of each cell determined from said compressed image;
- a step of estimating the probability of S-value by delaying said decoded S-value; and
- a step of determining the current symbol through estimating said probability of S-value.

9. The binary image restoring method of claim 8, wherein said method further comprising;
- a step of entropy-decoding the C-value of each cell determined from said compressed image;
- a step of estimating the probability of C-value by delaying said decoded C-value and in addition using the S-value that is stored in decoded format in the image buffer; and
- a step of determining the probability of the current symbol through estimating said probability of C-value.

10. The binary image restoring method of claim 9, wherein entropy-decoding process for said estimated probabilities of the S-value and the C-value of the current cell is characterized to output through a single combined entropy-decoder.

11. The binary image restoring method of claim 9, wherein entropy-decoding process for said estimated probabilities of the S-value and the C-value of the current cell is characterized to output through one of the arbitrarily chosen entropy-decoders.

* * * * *